(12) United States Patent
Hawkes et al.

(10) Patent No.: US 11,632,999 B2
(45) Date of Patent: Apr. 25, 2023

(54) CONSTANT FORCE IMPACT PROTECTION DEVICE

(71) Applicant: The Board of Trustees of the Leland Stanford Junior University, Stanford, CA (US)

(72) Inventors: Elliot W. Hawkes, Santa Barbara, CA (US); David B. Camarillo, San Francisco, CA (US); Srinivasan Arul Suresh, Stanford, CA (US); Mehmet Kurt, Hoboken, NJ (US); Michael G. Fanton, Los Altos, CA (US); Mark R. Cutkosky, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 146 days.

(21) Appl. No.: 16/485,727

(22) PCT Filed: Feb. 13, 2018

(86) PCT No.: PCT/US2018/018062
§ 371 (c)(1),
(2) Date: Aug. 13, 2019

(87) PCT Pub. No.: WO2018/148753
PCT Pub. Date: Aug. 16, 2018

(65) Prior Publication Data
US 2020/0046056 A1    Feb. 13, 2020

Related U.S. Application Data

(60) Provisional application No. 62/458,314, filed on Feb. 13, 2017.

(51) Int. Cl.
*F16F 13/08*    (2006.01)
*A42B 3/06*    (2006.01)
(Continued)

(52) U.S. Cl.
CPC .............. *A42B 3/064* (2013.01); *A42B 3/121* (2013.01); *A63B 71/081* (2013.01); *F16F 9/10* (2013.01);
(Continued)

(58) Field of Classification Search
CPC .......... F16F 7/12; F16F 9/0481; F16F 9/0472; F16F 9/10; F16F 13/10; F16F 13/102;
(Continued)

(56) References Cited

U.S. PATENT DOCUMENTS

| 2,875,861 A | 3/1959 | Rene |
| 3,039,109 A | 6/1962 | Simpson |

(Continued)

FOREIGN PATENT DOCUMENTS

| CN | 103284393 | 9/2013 |
| DE | 3300276 | 7/1984 |

(Continued)

OTHER PUBLICATIONS

Machine translation of JP 61171930 (no date).*
Machine translation of JP 61197836 (no date).*

*Primary Examiner* — Nicholas J Lane
(74) *Attorney, Agent, or Firm* — Lumen Patent Firm

(57) ABSTRACT

A protective impact device is provided that produces an approximately constant force during compression. The device distinguishes several structural features. First, the cross-sectional area in between two impact surfaces increases over the stroke distance when compression takes place. Second, a compressible fluid containing vessel, held in between two impact surfaces, defines an outer shape with a positive second derivative slope defined from one impact surface towards the other impact surface. Third, orifices allow the fluid to bleed out from the compressible vessel when an impact force causes compression of the protective (Continued)

impact device. The resulting approximately constant force scales more or less linearly with impact energy, regardless of impact velocity caused by the impact force. Applications include athletic equipment, automotive bumpers, aircraft landing gear, and any other application that would benefit from maximum energy absorption during an impact.

9 Claims, 9 Drawing Sheets

(51) Int. Cl.
- *A42B 3/12* (2006.01)
- *F16F 9/34* (2006.01)
- *F16F 9/10* (2006.01)
- *F16F 9/32* (2006.01)
- *A63B 71/08* (2006.01)
- *A63B 71/10* (2006.01)

(52) U.S. Cl.
CPC ............ *F16F 9/3207* (2013.01); *F16F 9/34* (2013.01); *A42B 3/125* (2013.01); *A63B 71/10* (2013.01); *A63B 2209/00* (2013.01); *A63B 2243/007* (2013.01)

(58) Field of Classification Search
CPC ........ F16F 13/08; F16F 13/085; F16F 13/108; A42B 3/121; A63B 71/081
See application file for complete search history.

(56) References Cited

U.S. PATENT DOCUMENTS

| | | |
|---|---|---|
| 3,600,714 A | 8/1971 | Cade |
| 3,609,764 A | 10/1971 | Morgan |
| 3,761,959 A | 10/1973 | Dunning |
| 3,831,923 A * | 8/1974 | Meldrum ............ F16F 1/422 267/141 |
| 3,849,801 A | 11/1974 | Holt |
| 3,872,511 A * | 3/1975 | Nichols ............ A42B 3/121 2/413 |
| 3,995,901 A | 12/1976 | Filbert, Jr. |
| 4,375,108 A | 3/1983 | Gooding |
| 4,570,911 A * | 2/1986 | Konishi ............ F16F 13/107 267/140.13 |
| 5,181,279 A | 1/1993 | Ross |
| 5,204,998 A * | 4/1993 | Liu ............ F16F 1/3732 2/411 |
| 5,815,846 A | 10/1998 | Calonge |
| 6,154,889 A | 12/2000 | Moore, III |
| 6,453,476 B1 | 9/2002 | Moore, III |
| 7,774,866 B2 | 8/2010 | Ferrara |
| 8,127,373 B1 | 3/2012 | Fodemski |
| 8,856,972 B2 | 10/2014 | Kirshon |
| 8,950,735 B2 | 2/2015 | Reynolds |
| 10,238,950 B2 * | 3/2019 | Kuntz ............ A42B 3/067 |
| 10,350,477 B2 * | 7/2019 | Schneider ............ A63C 17/0046 |
| 10,716,469 B2 * | 7/2020 | Krueger ............ A61B 3/113 |
| 2005/0187043 A1 | 8/2005 | Miller |
| 2006/0059606 A1 | 3/2006 | Ferrara |
| 2006/0070170 A1 * | 4/2006 | Copeland ............ A63B 71/10 2/411 |
| 2008/0155735 A1 | 7/2008 | Ferrara |
| 2013/0125294 A1 | 5/2013 | Ferrara |
| 2013/0247284 A1 | 9/2013 | Hoshizaki |
| 2013/0283506 A1 | 10/2013 | Archbold |
| 2014/0097052 A1 * | 4/2014 | Reynolds ............ F16F 1/376 188/377 |
| 2014/0173810 A1 | 6/2014 | Suddaby |
| 2015/0223545 A1 | 8/2015 | Fraser |
| 2015/0230535 A1 * | 8/2015 | McGuckin, Jr. ....... A42B 3/125 2/413 |
| 2016/0258503 A1 * | 9/2016 | Beyer ............ F16F 9/0481 |

FOREIGN PATENT DOCUMENTS

| | | |
|---|---|---|
| EP | 0506696 | 10/1992 |
| GB | 2131517 A * | 6/1984 ............ F16F 9/0481 |
| JP | 61171930 A * | 7/1986 ............ F16F 13/08 |
| JP | 61197836 A * | 9/1986 ............ F16F 13/08 |
| WO | WO1991005489 | 5/1991 |
| WO | WO2005049384 | 6/2005 |

\* cited by examiner

Increasing contact area using discrete cylinders

Isometric view:

Side view:

CONSTANT FORCE IMPACT PROTECTION DEVICE

CROSS-REFERENCE TO RELATED APPLICATIONS

This application is a 37 of PCT/US2018/018062 filed Feb. 13, /2018. PCT/US2018/018062 claims the benefit of US Provisional Application 62/458314 filed Feb. 13, 2017.

FIELD OF THE INVENTION

This invention relates to impact protection devices to reduce the incidence of brain injuries and other applications requiring impact mitigation.

BACKGROUND OF THE INVENTION

The effectiveness of current padding materials used for energy absorption is highly dependent on the impact energy. Intuitively, very stiff padding is necessary for high impact speeds to prevent bottoming out. However, this stiff padding will be less effective in lower impact speeds as it will apply higher forces than necessary to absorb the impact energy.

Because of this dilemma, modern-day safety equipment cannot adequately protect wearers from injury. For example, we can examine the deficiencies of athletic helmets and the increasing the rate of concussion; although helmet technology has developed over the years, incidence of brain injuries in recreational sports such as football and bicycling continue to be exceptionally high.

The present invention addresses these issues and provides padding technology for impact protection with the goal to reduce the incidence of brain injuries.

SUMMARY OF THE INVENTION

The present invention provides a protective impact device that produces an approximately constant force during the compression. The approximately constant force scales more or less linearly with impact energy, regardless of impact velocity caused by the impact force. The protective impact device distinguishes two impact surfaces (a first and a second impact surface) more or less parallel to each other. The area of the first impact surface is smaller than the area of the second impact surface. In one example, the area of the second impact surface is at least 20% greater than the area of the first impact surface. A perpendicular distance is defined as the stroke distance between the first and second impact surface. An important aspect of the design of the protective impact device is the fact that the cross-sectional area parallel to and in between the first and second impact surfaces increases, either in a continuous or discrete fashion, over the stroke distance from the first impact surface towards the second impact surface.

A compressible vessel is held in between first and second impact surfaces, which brings another important aspect of the design of the protective impact device such that the compressible vessel in between the first and second impact surfaces defines an outer shape with a positive second derivative slope defined from the first impact surface towards the second impact surface. In one example, the outer shape is a continuous shape for at least 90% of the stroke distance. In another example, the outer shape has a discrete shape, and the outer edges of the discrete shape define the positive second derivative slope defined from the first impact surface towards the second impact surface.

For design or structural reasons, in a variation, the first impact surface and second impact surface could be part of compressible vessel. A fluid is contained within the compressible vessel, preferably an incompressible fluid. One or more orifices situated at convenient locations allow the fluid to bleed out from the compressible vessel when an impact force causes compression of the protective impact device. Compression is defined by the first impact surface moving towards the second impact surface along the stroke distance. A fluid collection chamber is fluidly connected with the compressible vessel via the one or more orifices, and one or more one-way valves allow the fluid to return to the compressible vessel back into the compressible vessel after the compression. The approximately constant force is established design features of the protective impact device and the bleeding liquid through the one or more orifices during the compression.

BRIEF DESCRIPTION OF THE DRAWINGS

FIG. 6B shows fluid pressure dynamics and contact area of vessel during compression. Increasing contact area cancels out decreasing fluid pressure to create a constant force. FIG. 6C shows simulated force displacement curve of parabolic damper. Optimal curvature of parabolic damper allows for a near constant force-displacement curve regardless of initial contact speed.

FIG. 7A) Protection impact devices distributed inside of a conventional football helmet shell to provide full protection coverage. FIG. 7B shows simulated angular acceleration of ideal damper (maximum initial peak below 4000) versus conventional foam padding (maximum initial peak close to 7000) at a 9.0 m/s head impact. Concussive region corresponds to 2σ below the mean peak angular acceleration of published concussions. FIG. 7C shows peak linear accelerations at three different impact speeds for ideal damper (left handed bars of the two adjacent bars) versus conventional foam padding (right handed bars of the two adjacent bars).

DETAILED DESCRIPTION

An ideal protective equipment pad would be able to absorb all of the kinetic energy of any impact over the entire displacement of the pad, applying a constant force throughout the entire displacement. Theoretically, if safety equipment had these ideal characteristics, debilitating injuries such as concussions could be greatly reduced or even prevented.

Nearly all helmets currently for sale in for example the United States use a rigid material (expanded polypropylene foam) as the energy absorbing liner. Achieving ideal energy absorption characteristics is not possible with this foam, due to the nature of solid materials. In a solid foam pad, the entire thickness cannot be utilized, because the compaction of the material limits the displacement. Furthermore, the force of the foam greatly increases throughout its displacement, due to hardening and bottoming out at its limits. This has necessitated foam padding to be designed for the extreme impacts, making them too stiff to optimally absorb energy in lower severity impacts that can still cause serious traumatic brain injuries.

Fluid-filled padding has the potential to achieve the ideal characteristics of safety padding. A number of ideas utilize fluid filled compartments to absorb and dissipate the impact energy, in which fluid or gel inside these liners are displaced, through either porous containers or using interconnected compartments, to absorb energy and/or distribute impact forces during compression. Other ideas utilize fluid or gel to change the frictional properties of helmets, or partially filled fluid pads, which use both air and liquid. Designs also attempt to achieve improvements over conventional material padding by modulating air pressure rather than liquid pressure using microprocessor controlled valves, small air pockets, or inflatable padding. However, none of these ideas are designed to exhibit the ideal properties of a padding material, namely exerting constant force over the entire displacement of the pad regardless of impact velocity.

In one embodiment of the invention we utilize pressurized fluid flow to achieve the optimal energy absorption during impact. First, fluid-filled pads can displace through their entire thickness unlike foam padding. Additionally, the energy dissipation of a turbulent fluid flowing through an orifice is proportional to the impact energy, and thus the embodiment should perform optimally regardless of the impact speed. This embodiment has a monotonically increasing shape profile designed to increase the cross-sectional area to create a near constant force over the entire displacement of the vessel. Properly tuned, and implemented in a football helmet, we expect up to a 50% reduction in head accelerations compared to existing foam padding.

Figure 1:
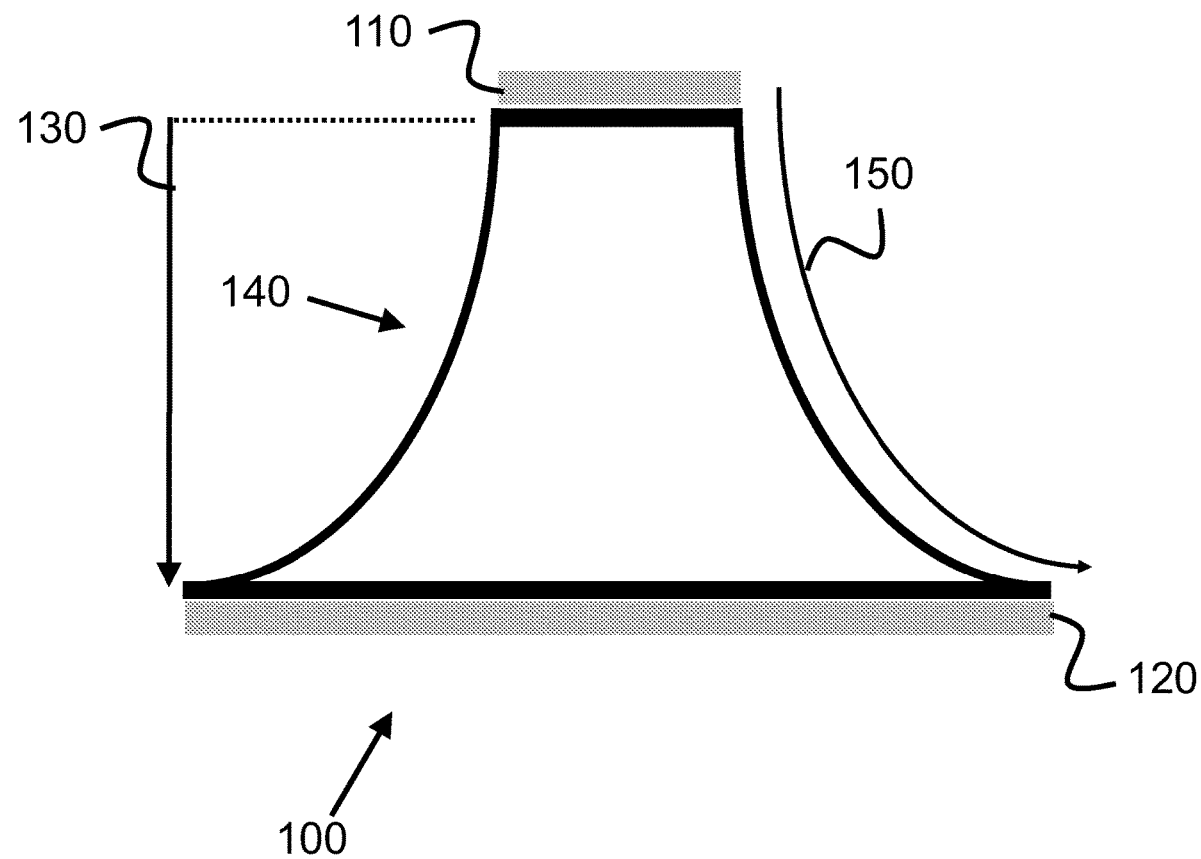
FIG. 1 shows a protection impact device according to exemplary embodiments of the invention with a continuous wall shape.
Figure 2:
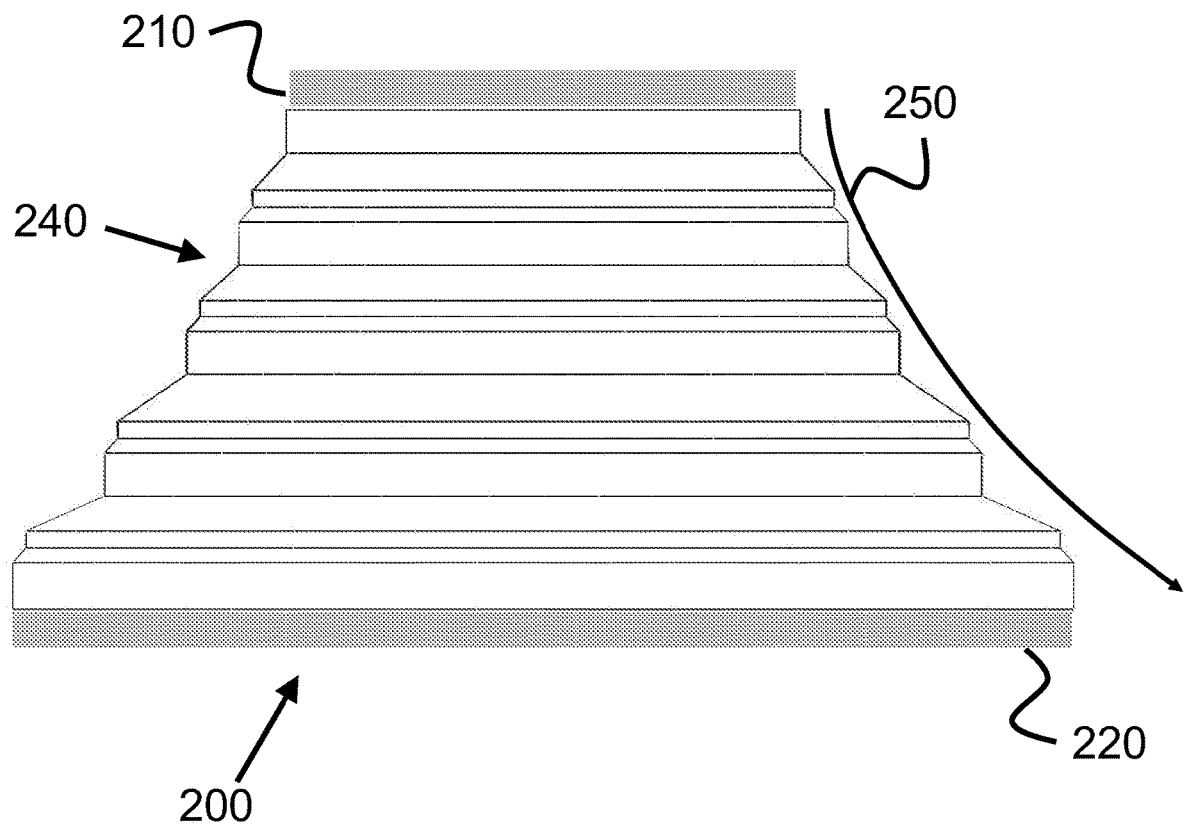
FIG. 2 shows a protection impact device according to exemplary embodiments of the invention with a discrete wall shape.

FIG. 1 shows a generic form of the protective impact device 100 with a first impact surface 110 and a second impact surface 120 more or less parallel to the first impact surface 110. The area of the first impact surface 110 is smaller than the area of the second impact surface 120. In one example, the area of the second impact surface 120 is at least 20% greater than the area of the first impact surface 110. In another embodiment, the area of the second impact surface 120 could be even at least 200% or even 300% greater than the area of the first impact surface 110. A perpendicular distance 130 between the first and second impact surface (110, 120) defines a stroke distance. Important in the design of the protective impact device 100 is that the cross-sectional area parallel to and in between the first and second impact surfaces (110, 120) increases, either in a continuous or discrete fashion, over the stroke distance 130 from the first impact surface 110 towards the second impact surface 120. FIG. 1 shows protective impact device 100 with the cross-sectional area parallel to and in between the first and second impact surfaces (110, 120) increases either in a continuous fashion. FIG. 2 shows protective impact device 100 with the cross-sectional area parallel to and in between the first and second impact surfaces (210, 220) increases a discrete fashion.

Back to FIG. 1, a compressible vessel 140 is held in between first and second impact surfaces (110, 120). Compressible vessel 140, in between the first and second impact surfaces, defines a continuous outer shape with a positive second derivative slope defined from the first impact surface 110 towards the second impact surface 120. The positive second derivative slope is indicated by arrow 150 and follows the outer curvature of the continuous slope of the compressible vessel 140.

Referring to FIG. 2, compressible vessel 240 is based on a discrete pattern/shape and held in between first and second impact surfaces (210, 220). Compressible vessel 240, in between the first and second impact surfaces, defines a positive second derivative slope of the outer edges of the discrete pattern when going from the first impact surface 210 towards the second impact surface 220. This positive second derivative slope is indicated by arrow 250 and follows the outer edged curvature of the discrete slope of the compressible vessel 140.

Figure 3:
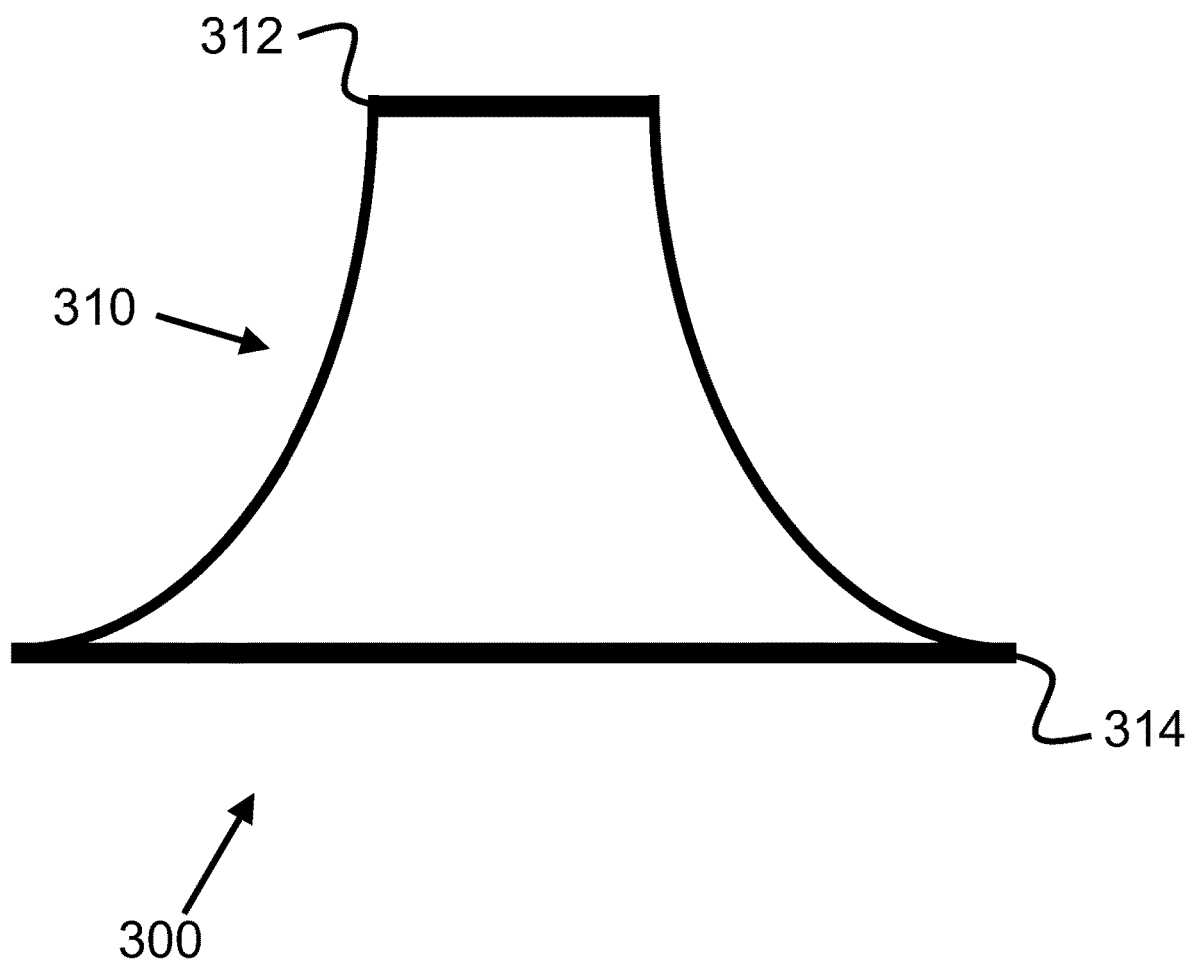
FIG. 3 shows an alternate example of the protection impact device according to exemplary embodiments of the invention.
Figure 4:
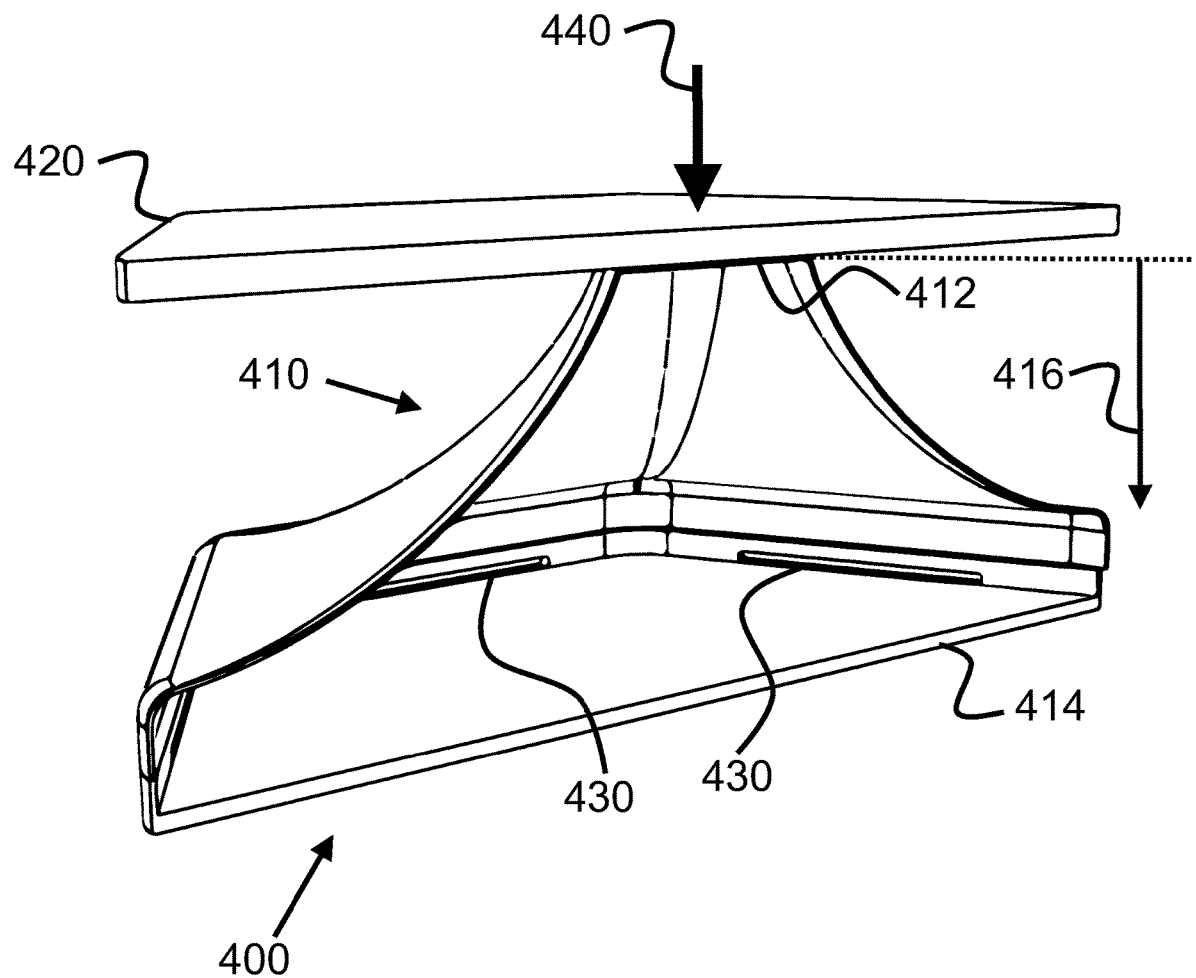
FIG. 4 shows a protection impact device with orifices according to exemplary embodiments of the invention.

FIG. 3 shows the alternate embodiment 300 in which the first impact surface 312 and second impact surface 314 are part of compressible vessel 310. In the design, it is important to maintain the structural design of the impact surfaces in terms of their relative area ratio. FIG. 4 show a variation of the design 400 with a first impact surface 412 a second impact surface 414. An additional surface 420 could be beneficial above the first impact surface 412 for implementation reasons, a rigid plate to ensure axial compression of vessel, yet the ratio of the first and second impact surface (412, 414) applied to compressible vessel 410 is maintained.

The compressible vessel contains a fluid, preferably an incompressible fluid. The wall of the compressible vessel is preferably an elastic and compressible wall while maintaining the positive second derivative slope. In one example, the compressible vessel could be reinforced by axial fibers to prevent bulging out from its preferred concave shape towards a convex shape.

FIG. 4 shows one or more orifices 430 to allow the fluid to bleed out or pressed out from compressible vessel 410 when an impact force 440 causes compression of to protective impact device 400. The compression is defined by the first impact surface 412 moving towards the second impact 414 surface along the stroke distance 416. To allow structural space in this example of the protective impact device the outer shape is a continuous shape for at least 90% of the stroke distance. However, as a skilled artisan would appreciate, there are various ways to implement the orifices, which could be at the bottom (see FIG. 5), sides or top aspect of the compressible vessel.

Figure 5:
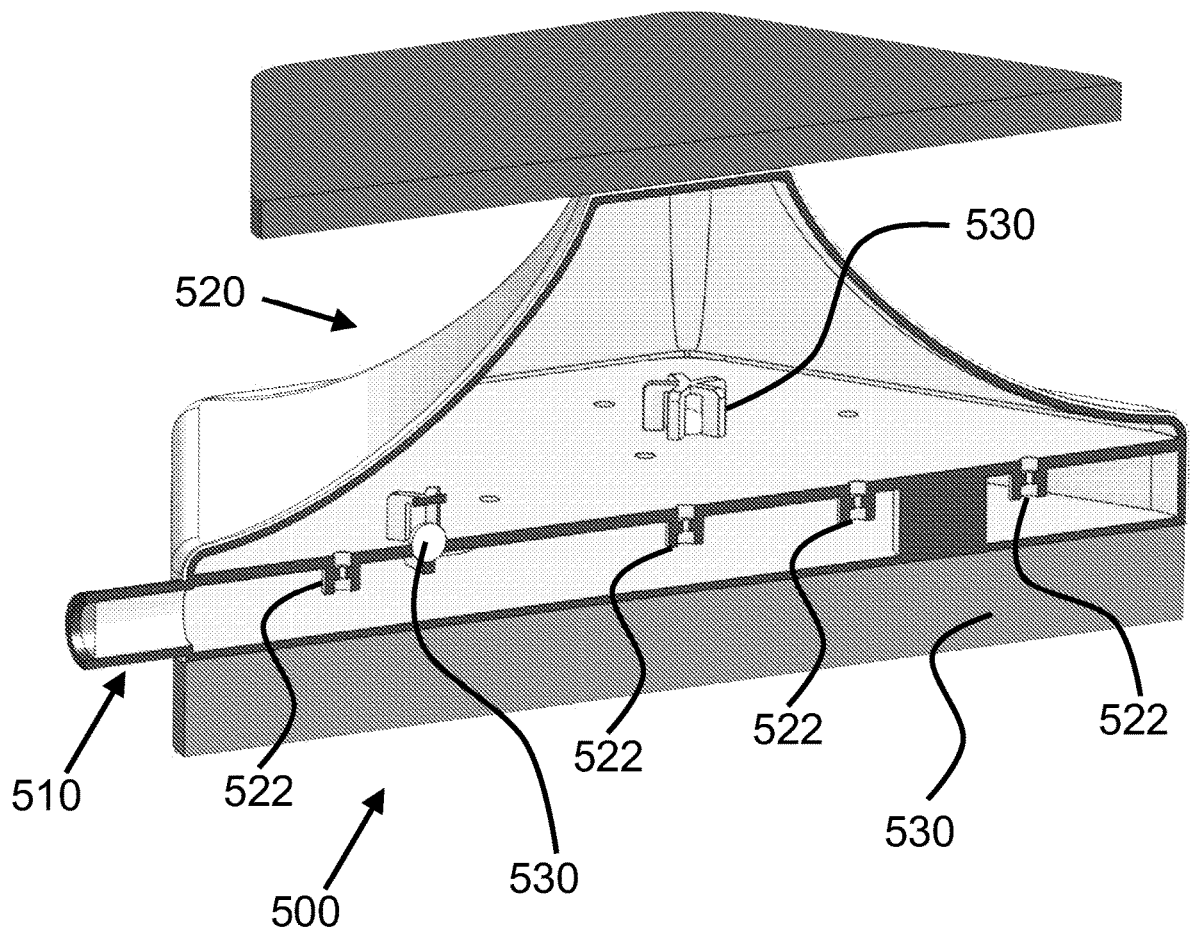
FIG. 5 shows a protection impact device with a fluid collection chamber according to exemplary embodiments of the invention.

FIG. 5 shows protective impact device similar to FIG. 4 with added a fluid collection chamber 510 fluidly connected with compressible vessel 520 via the one or more orifices 522. Protective impact device 500 further includes one or more one-way valves 530 to allow the fluid to return to compressible vessel 520 back into the compressible vessel after the compression. Layer 540 could be a thin layer of foam padding directly below fluid collection chamber 510 as a factor of safety in the rare case of bottoming out.

During compression, (incompressible) liquid turbulently flows through the compressible vessel into a fluid collection chamber through a series of small orifices. In one example. during de-compression, the fluid collection chamber, which could be elastic, pushes the liquid through the one-way valve back into the compressible vessel.

Figures 6A, 6B, 6C:
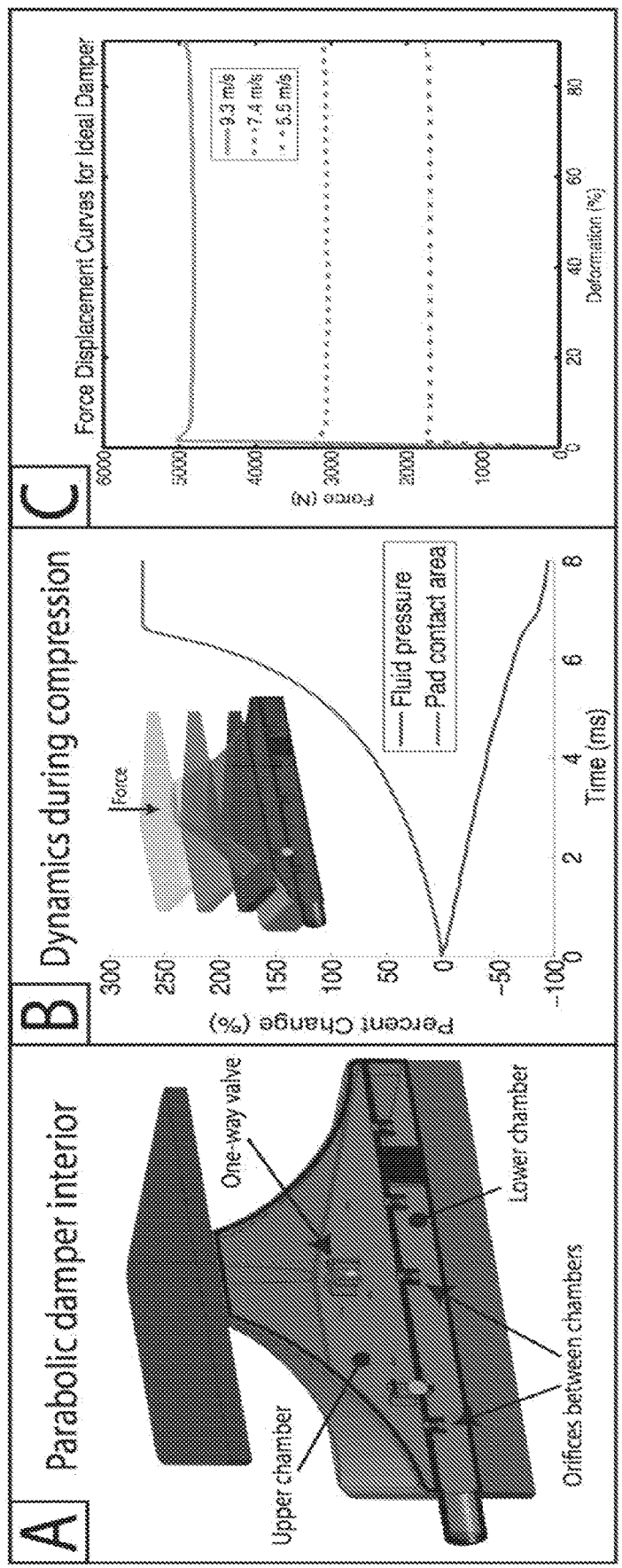
FIGS. 6A-C show a protection impact device according to exemplary embodiments of the invention with its dynamical behavior during compression and force during deformation/compression.

Referring to FIGS. 6A-C, the protective impact device produces an approximately constant force during the compression. In one example, the variation could be ±10% of the average constant force over the stoke distance. The approximate constant force is established by the bleeding liquid through the one or more orifices during the compression. The approximate constant force scales more or less linearly with the impact energy, regardless of impact velocity caused by the impact force. This is due to the physics of energy dissipation of fluid flowing through an orifice. In turbulent flow, energy absorbed is proportional to the square of velocity of the fluid flow through the orifice, or equivalently, the change in volume of the chamber of the damper. This ideal property allows the compressible vessel or protection impact device to perform optimally regardless of the impact velocity.

The protective mechanism can be optimized to absorb maximum energy in different applications by adjusting the monotonically increasing contact-area function, the orifice size, and the stroke length.

Figures 7A, 7B, 7C:
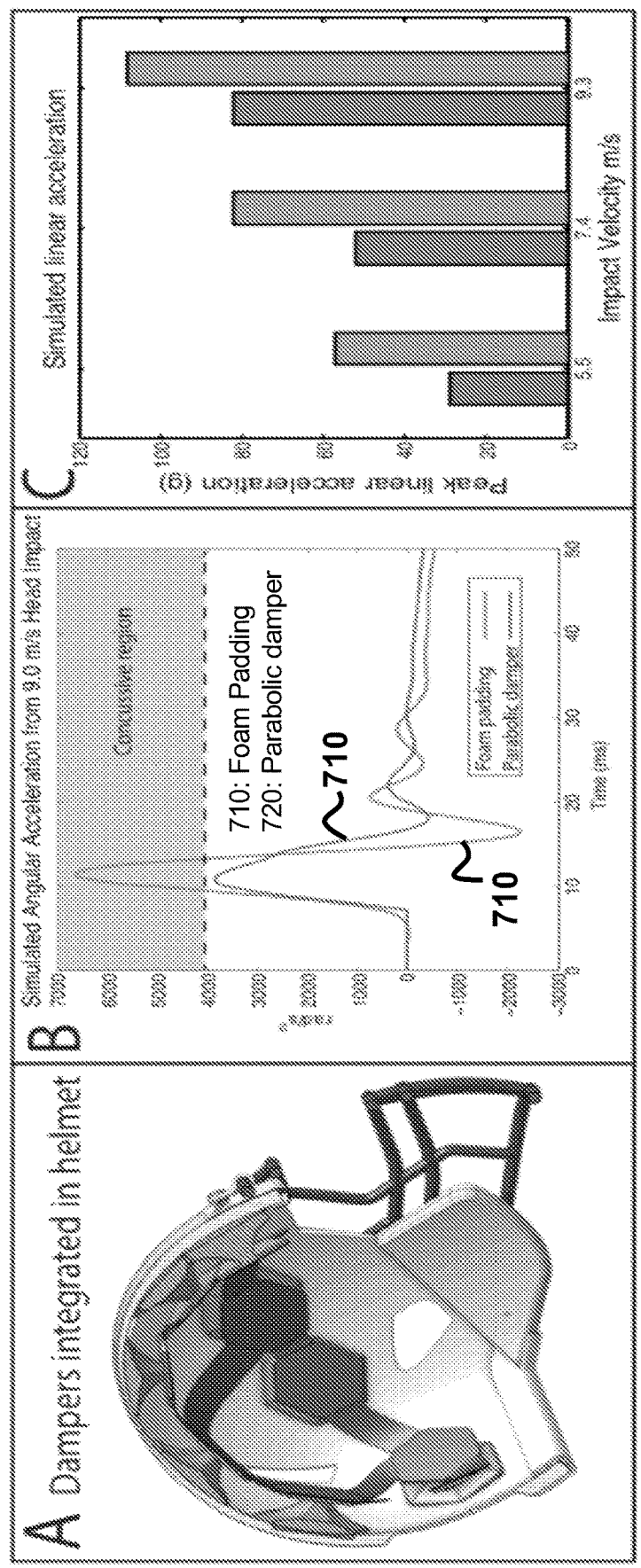
FIGS. 7A-C shows according to exemplary embodiments of the invention.

FIGS. 7A-C show an exemplary implementation of the invention in a football helmet, although embodiments of the invention could be modified for use in other safety equipment for a variety of applications. Multiple fluid vessels are distributed on the inner shell of the helmet for full protection coverage. Each fluid vessel acts independently of the others, so the number of vessels could be easily changed based on the application. In this example, lightweight, soft foam padding is integrated around and between the parabolic fluid vessels for comfort and to ensure a secure fit with the head. This comfort padding is orders of magnitude softer than the fluid vessels to prevent unwanted contact forces.

Potential applications include athletic equipment, automotive bumpers, aircraft landing gear, and any other application that would benefit from maximum energy absorption during an impact. As an example, the benefits of this technology are clear when applied to padded safety equipment and compared to conventional foam padding. Integrated into a conventional football helmet shell, the fluid-filled vessel would vastly reduce head accelerations experienced during helmeted head impacts. Simulation results show up to 50% reduction in linear and angular accelerations when compared to conventional expanded polypropylene foam helmet padding (FIGS. 7B-C).

Figure 8:
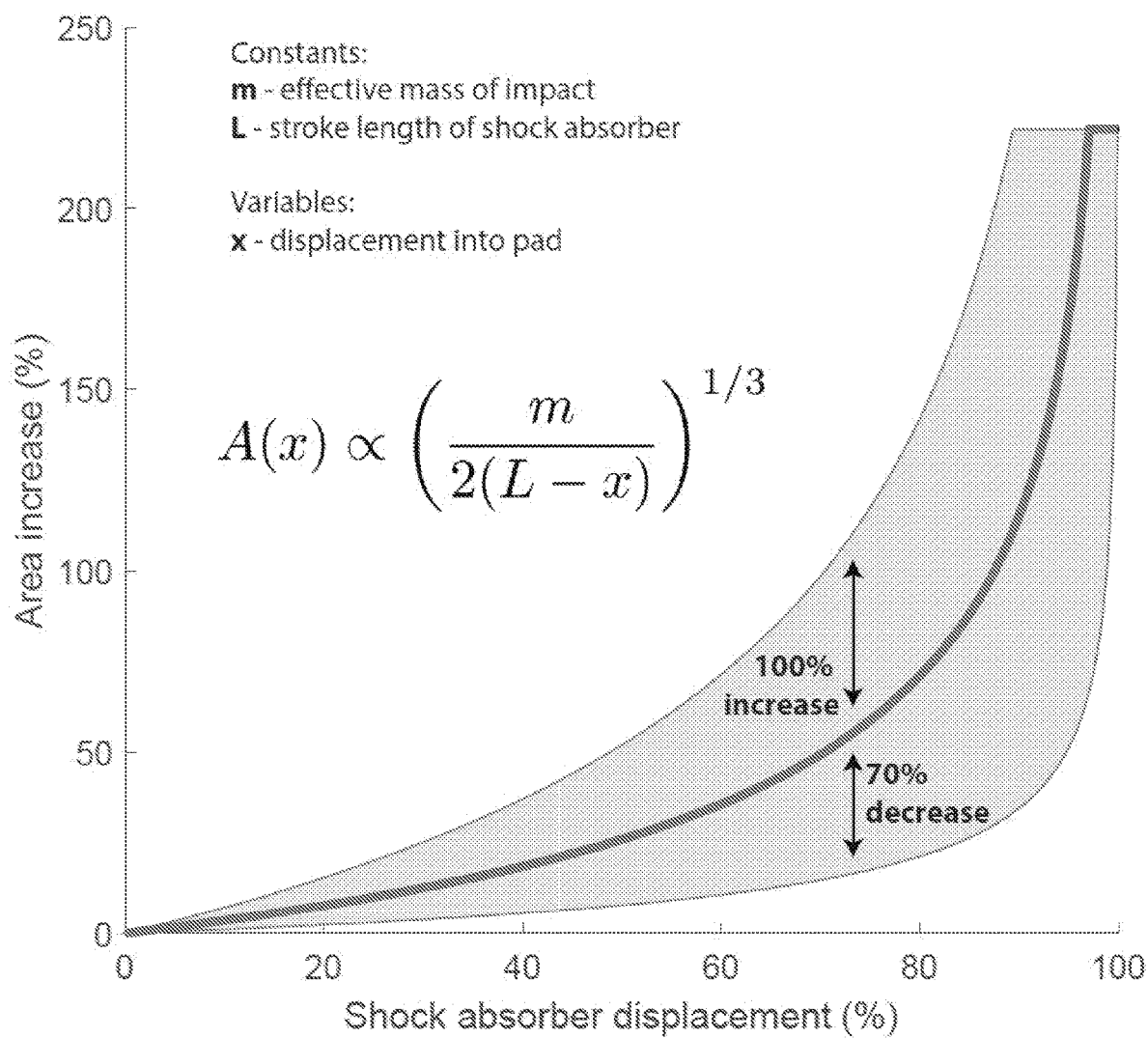
FIG. 8 shows according to an exemplary embodiment of the invention the cross-sectional area as a function of the displacement of the compressible vessel, i.e. when the first impact surface approaches the second impact surface. The 100% increase and 70% decrease indicate ±range compared to the optimal curve.
Figure 9:
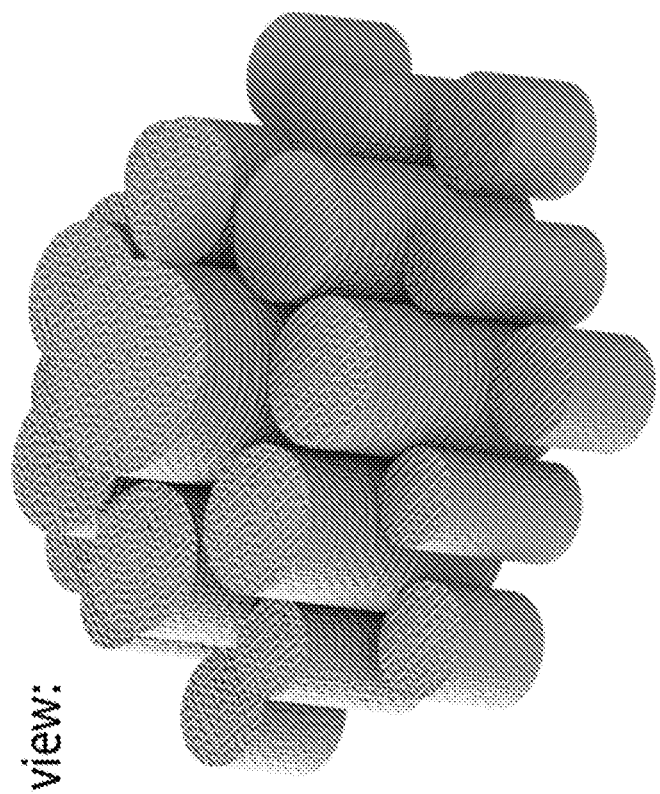
FIG. 9 shows according to exemplary embodiments of the invention an alternative approach to increasing contact area via a number of sealed compliant cylinder pads of varying heights. This approach would maintain a constant force within 15%.
Figure 9:
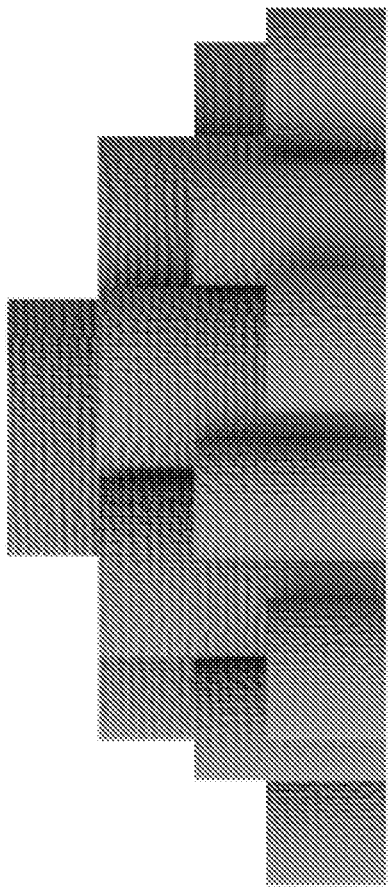

FIG. 8 shows the cross-sectional area as a function of the displacement of the compressible vessel, i.e. when the first impact surface approaches the second impact surface. Although shown in FIG. 1 as a so-called parabolic-shaped compressive vessel or protective impact device, the increasing contact area during compression could be discretized and achieved via a number of sealed compliant cylinder pads of varying heights (FIG. 9). Initially, only the tallest cylinder would make contact during compression, but with more displacement, more cylinders would contact. This approach would allow for a near constant force (within 15%), while simplifying manufacturing and implementation.

What is claimed is:

1. A protective impact device, comprising:
   (a) a first impact surface;
   (b) a second impact surface substantially parallel to the first impact surface;
   wherein the area of the first impact surface is smaller than the area of the second impact surface,
   wherein a perpendicular distance between the first and second impact surface defines a stroke distance;
   (c) a compressible vessel held in between the first and second impact surfaces, wherein a cross-sectional area defined by the compressible vessel increases in a continuous fashion over the stroke distance from the first impact surface towards the second impact surface and wherein the compressible vessel in between the first and second impact surfaces defines an inner wall shape with a positive second derivative slope defined over the stroke distance, defined over the entire inner wall and defined from the first impact surface towards the second impact surface, wherein the compressible vessel has reinforcement fibers to prevent the compressible vessel bulging;
   (d) a fluid contained within the compressible vessel; and
   (e) one or more orifices to allow the fluid to bleed out from the compressible vessel when an impact force causes compression of the protective impact device, wherein the compression is defined by the first impact surface moving towards the second impact surface along the stroke distance.

2. The protective impact device as set forth in claim 1, wherein the area of the second impact surface is at least 20% greater than the area of the first impact surface.

3. The protective impact device as set forth in claim 1, wherein the wall shape is a continuous shape for at least 90% of the stroke distance.

4. The protective impact device as set forth in claim 1, further comprising a fluid collection chamber fluidly connected with the compressible vessel via the one or more orifices.

5. The protective impact device as set forth in claim 1, further comprising one or more one-way valves to allow the fluid to return to the compressible vessel back into the compressible vessel after the compression.

6. The protective impact device as set forth in claim 1, wherein the protective impact device produces an approximately constant force during the compression.

7. The protective impact device as set forth in claim 1, wherein the protective impact device produces an approximately constant force established by the bleeding liquid through the one or more orifices during the compression.

8. The protective impact device as set forth in claim 1, wherein the protective impact device produces an approximately constant force that scales substantially linearly with impact energy, regardless of impact velocity caused by the impact force.

9. The protective impact device as set forth in claim 1, wherein the reinforcement fibers are axial fibers.

* * * * *